(12) United States Patent
Halbweiss et al.

(10) Patent No.: US 7,344,180 B2
(45) Date of Patent: Mar. 18, 2008

(54) CONVERTIBLE VEHICLE HAVING A HARDTOP ROOF

(75) Inventors: Thomas Halbweiss, Remseck (DE); Robert Koschien, Ostfildern (DE)

(73) Assignee: Magna Car Top Systems GmbH, Bietigheim-Bissingen (DE)

( * ) Notice: Subject to any disclaimer, the term of this patent is extended or adjusted under 35 U.S.C. 154(b) by 0 days.

(21) Appl. No.: 11/678,254

(22) Filed: Feb. 23, 2007

(65) Prior Publication Data

US 2007/0200386 A1 Aug. 30, 2007

(30) Foreign Application Priority Data

Feb. 27, 2006 (DE) .................. 10 2006 009 507

(51) Int. Cl.
*B60J 7/00* (2006.01)

(52) U.S. Cl. ............ 296/108; 296/107.01; 296/107.07; 296/107.08; 296/107.17

(58) Field of Classification Search .......... 296/107.01, 296/108, 107.07, 107.08, 107.16, 107.14, 296/24.44
See application file for complete search history.

(56) References Cited

U.S. PATENT DOCUMENTS

| 6,145,915 A | 11/2000 | Queveau et al. |
| 6,983,976 B2 * | 1/2006 | Reinsch .................. 296/107.08 |
| 2002/0175536 A1 * | 11/2002 | Biecker et al. ........ 296/107.07 |
| 2004/0036312 A1 * | 2/2004 | Eichholz et al. ....... 296/107.08 |

FOREIGN PATENT DOCUMENTS

| DE | 699 03 212 T2 | 2/2003 |
| DE | 101 62 153 A1 | 6/2003 |
| DE | 10 2004 018 894 A1 | 11/2005 |
| DE | 10 2004 025 051 B4 | 12/2005 |

* cited by examiner

*Primary Examiner*—Lori L. Lyjak
(74) *Attorney, Agent, or Firm*—Brooks Kushman P.C.

(57) ABSTRACT

A convertible vehicle includes a roof having roof parts including a rear roof part. The roof is movable between a closed position in which the parts cover the vehicle and a stored position in which the parts are stacked within a storage compartment of the vehicle. A trunk lid opens and closes the compartment. The rear roof part includes C-pillars on respective sides of the vehicle and a window. The window is independently movable from the rear roof part between a normal position in which the window lies between the C-pillars and a raised position in which the window lies outside of the rear roof part. An adjusting device connected between the rear roof part and the window moves the window between the normal and raised positions. A storage shelf connected to the trunk lid extends below the rear roof part into the vehicle when the roof is closed.

20 Claims, 5 Drawing Sheets

CONVERTIBLE VEHICLE HAVING A HARDTOP ROOF

CROSS-REFERENCE TO RELATED APPLICATIONS

This application claims foreign priority benefits under 35 U.S.C. § 119(a)-(d) to DE 10 2006 009 507.3, filed Feb. 27, 2006, which is hereby incorporated by reference in its entirety.

BACKGROUND OF THE INVENTION

1. Field of the Invention

The present invention relates to a convertible vehicle having a roof movable between a closed position in which the roof covers the vehicle interior and a stored position in which the roof is stacked and stored in a storage compartment of the vehicle thereby exposing the vehicle interior.

2. Background Art

DE 10 2004 025 051 B4 describes a hardtop roof for a convertible vehicle. The roof includes front and rear roof parts. The rear roof part includes a rear window. The roof is movable between a closed position in which the roof parts cover the vehicle interior and a stored position in which the roof parts are arranged in a stack and stored in a storage compartment of the vehicle thereby exposing the vehicle interior. A kinematic system connects the rear window and the front roof part. The kinematic system is adjustable to move the rear window between a normal position in which the rear window lies within the rear roof part and an elevated position in which the rear window is raised above the front roof part. The latter configuration results in the roof being stacked for the stored position.

In the stacked roof package, the rear roof part lies at the bottom of the stack in an opposite orientation than its orientation in the closed roof position. The front roof part lies above the rear roof part and the rear window lies on the front roof part. A trunk lid of the vehicle closes the storage compartment. The trunk lid opens about a transversely extending swivel axis to enable the stacked roof to move into the storage compartment.

An inclined position of the rear roof part behind the vehicle seats beneath the rear window results in a storage space. A storage shelf covers the storage space. The storage shelf is either directly connected to the rear roof part to move therewith as described by DE 101 62 153 A1 or is connected via a kinematic system to either the roof or a vehicle body-side component. Known storage shelve arrangements limit the possibilities for compact stacking of the roof in the stored position or require a kinematic system.

SUMMARY OF THE INVENTION

An object of the present invention is to provide compact storage of a hardtop roof of a convertible vehicle using simple design measures.

In carrying out the above object and other objects, the present invention provides a convertible vehicle. The vehicle includes a storage compartment and a trunk lid movable to open and close the storage compartment. The vehicle further includes a roof having roof parts including a rear roof part. The roof is movable between a closed position in which the roof parts cover the vehicle interior and a stored position in which the roof parts are stacked on top of one another and stored in the storage compartment thereby exposing the vehicle interior. The rear roof part includes a pair of C-pillars on respective sides of the vehicle body and a rear window. The rear window is independently movable from the rear roof part between a normal position in which the rear window lies between the C-pillars in a plane of the rear roof part and a raised position in which the rear window lies outside of the plane of the rear roof part. An adjusting device is connected between the rear roof part and the rear window for moving the rear window between the normal and raised positions. A storage shelf is connected to the trunk lid on a side of the trunk lid facing the vehicle interior. The storage shelf extends below the rear roof part into the vehicle interior when the roof is in the closed position.

Further, in carrying out the above object and other objects, the present invention provides a roof for a convertible vehicle having a storage compartment and a trunk lid movable to open and close the storage compartment. The roof includes front, center, and rear roof parts. The rear roof part includes a pair of laterally spaced apart pillars. The roof further includes a rear window and an adjusting device. The adjusting device movably supports the rear window onto the rear roof part such that the rear window is movable between a normal position in which the rear window lies between the pillars of the rear roof part in a plane of the rear roof part and a raised position in which the rear window lies outside of the plane of the rear roof part. The roof parts are independently movable from the rear window between a closed position for covering the interior of the vehicle and a stored position for storage in the storage compartment. In the closed position, the rear window is in its normal position lying between the pillars of the rear roof part in the plane of the rear roof part, the front roof part lies in front of the center roof part, the center roof part lies in front of the rear roof part, and the pillars of the rear roof part extend upward and forward. In the stored position, the rear window is in its raised position lying outside of the plane of the rear roof part and above the center roof part, the front roof part lies above the rear window, and the pillars of the rear roof part extend downward and rearward such that the rear window and the front, center, and rear roof parts are arranged in a stack. The roof further includes a storage shelf connectable to the trunk lid such that the storage shelf extends below the rear roof part in the closed position.

A multiple roof part hardtop roof for a convertible vehicle in accordance with embodiments of the present invention includes a movable rear window. The rear window is integrated as part of the rear roof part. An adjusting device moves the rear window from a normal position in which the rear window lies between lateral C-pillars of the rear roof part in the plane of the rear roof part to an offset raised position in which the rear window lies outside the plane of the rear roof part. A storage shelf is either situated on the trunk lid or on a component connected to the trunk lid, but is not situated on the vehicle body. The storage shelf horizontally extends into the vehicle interior and is situated beneath the lower edge of the rear roof part when the roof is in its closed position.

The multiple roof part hardtop roof in accordance with embodiments of the present invention has several advantages. The raising motion of the rear window relative to the plane of the rear roof part creates space for swiveling the trunk lid open to thereby open the storage compartment. The roof is stored in the space to achieve the stored roof position. As the trunk lid has to be raised to uncover the storage compartment, the storage shelf is also lifted as a result of its connection with the trunk lid. The storage shelf is lifted in a common swivel motion together with the trunk lid from its horizontal position projecting into the vehicle interior. As such, no additional control kinematic system is necessary for this motion. In addition, it is not necessary to have a connection between the storage shelf and a roof part. This simplifies the storage motion and reduces the storage volume in the storage compartment.

The raising motion of the rear window further reduces the storage volume in the stored position. Because the rear window is lifted from its normal position between the lateral C-pillars in the rear roof part, the C-pillars may be stored in lower lateral sections in the storage compartment. The space between the stored C-pillars either remains open thereby providing a larger usable trunk space or may be occupied by other parts of the roof without having to take into account the problem of downward arching of the rear window. For example, the rear window is brought into a parallel position above the roof part situated in front of it, and together with this roof part is lowered into the storage compartment, it being practical to maintain the orientation with the roof exterior facing upward (storage in the same direction). The rear window together with the this roof part forms a stacked roof package which may be stored as a unit.

This may be applied advantageously for three-part hardtop vehicle roofs by bringing the rear window into a position directly above the center roof part and swiveling the front roof part above the rear window. As such, in this stacked roof part package, the front roof part is on top, the rear window is in the middle, and the center roof part is at the bottom with each of the front roof part, the rear window, and the center roof part orientated in the same direction. This orientation is maintained in the storage compartment as well. The C-pillars and, optionally, an upper transverse frame in the rear roof part which connects the C-pillars, lie at the bottom in the storage compartment beneath the roof part package with the front and center roof parts and the rear window therebetween. The front and center roof parts and the rear window are oriented in the same direction, and together with the outer sides of the roof face upward whereas the C-pillars are stored in the opposite direction.

The storage shelf is movable and is held directly on the trunk lid. For example, the storage shelf is pivotably held onto the trunk lid via a rotary joint having a transversely extending rotational axis. This capability for swiveling motion allows a relative swivel motion between the storage shelf and the trunk lid which, when the roof is closed, may be used for opening the trunk when the storage shelf projects below the rear window into the vehicle interior and the trunk lid is to be opened for loading the trunk. On the other hand, to open the storage compartment in order to store the roof, it is sufficient to swivel the trunk lid upward about a transversely extending rotational axis at the rear of the vehicle after raising the rear window from its normal position between the C-pillars in the plane of the rear roof part. This maintains the relative position between the storage shelf and the trunk lid, i.e., the storage shelf lies in a common plane with the trunk lid. However, in this upward swiveling motion for opening the storage compartment the storage shelf may also perform a relative swivel motion with respect to the trunk lid.

As an alternative to a connection of the storage shelf directly to the trunk lid, a coupling of the storage shelf to another component connected to the trunk lid may be considered. For example, the storage shelf may be connected to a support or a tubular frame of the trunk lid which is pivotably connected to the vehicle body. During an upward swivel motion of the trunk lid about the rear rotational axis to enable the roof to move between its closed and stored positions, the trunk lid including the support frame swivel upward, whereas for opening the trunk the support frame remains in its starting position and the trunk lid is raised with respect to the support frame.

The above features, and other features and advantages of the present invention as readily apparent from the following detailed descriptions thereof when taken in connection with the accompanying drawings.

DETAILED DESCRIPTION OF THE PREFERRED EMBODIMENT(S)

Identical components are denoted by the same reference numerals in the figures. Letter F represents the forward direction of the vehicle.

Figure 1:
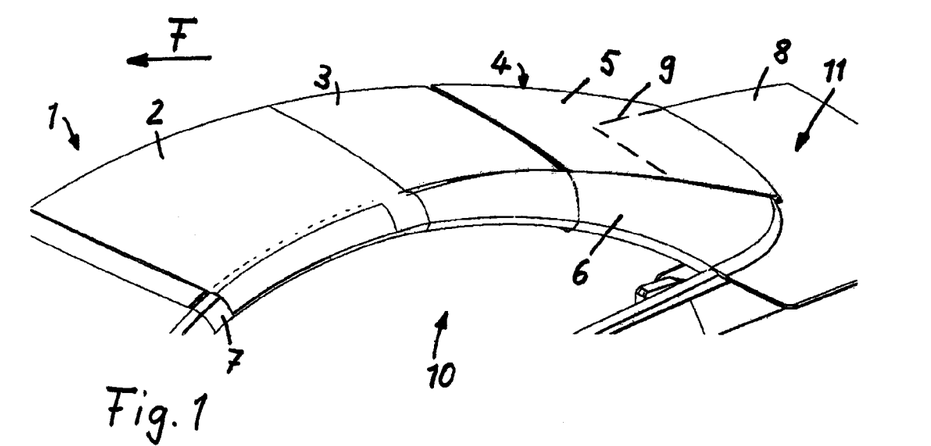
FIG. 1 illustrates a perspective view of a hardtop roof for a convertible vehicle in accordance with an embodiment of the present invention in which the roof includes front, center, and rear roof parts and a rear window, and the roof is in a closed position covering the vehicle interior with a storage shelf held on a trunk lid of the vehicle being guided below the rear window and into the vehicle interior.

Referring now to FIG. 1, a perspective view of a hardtop roof 1 for a convertible vehicle in accordance with an embodiment of the present invention is shown. Roof 1 is a three-part hardtop roof having three rigid roof parts 2, 3, 4. The roof parts include front roof part 2, center roof part 3, and rear roof part 4. Roof 1 is movable between a closed position and a stored position. In the closed position of roof 1, roof parts 2, 3, 4 extend over and cover interior 10 of the vehicle. In the stored position of roof 1, roof parts 2, 3, 4 are stacked on top of one another in a stacked roof package and lowered into a storage compartment 11 of the vehicle for storage therein thereby exposing vehicle interior 10.

FIG. 1 illustrates roof 1 in its closed position. Front roof part 2 is situated in front of center roof part 3 and center roof part 3 is situated in front of rear roof part 4 with roof parts 2, 3, 4 extending over and covering vehicle interior 10. Front roof part 2 adjoins windshield frame 7. Rear roof part 4 extends back to a trunk lid 8 of the vehicle. In the closed position of roof 1, roof parts 2, 3, 4 form a smooth, outwardly arched outer roof skin as shown in FIG. 1.

Rear roof part 4 includes a pair of lateral trim C-pillars 6 on respective sides of the vehicle body. C-pillars 6 extend upward and forward from the vehicle body when roof 1 is in its closed position as shown in FIG. 1. C-pillars 6 extend rearward and slightly downward into storage compartment 11 when roof 1 is in its stored position.

Rear roof part 4 includes a rear window 5 integrated therein. Rear window 5 is movable between a normal position in which rear window 5 lies between C-pillars 6 in the plane of rear roof part 4 and an offset raised position in which rear window 5 lies outside of the plane of rear roof part 4. In the closed position of roof 1, rear window 5 lies in its normal position between C-pillars 6 in the plane of rear roof part 4 as shown in FIG. 1.

A storage shelf 9 is held on the side of trunk lid 8 facing vehicle interior 10. Storage shelf 9 extends below rear roof part 4 into vehicle interior 10 when roof 1 is in its closed position as shown in FIG. 1.

Storage compartment 11 receives roof 1 when roof 1 is in its stored position. Storage compartment 11 is a component of the trunk of the vehicle. However, storage compartment 11 may be separate from the trunk. Trunk lid 8 is movable to close and open over storage compartment 11 thereby closing and opening storage compartment 11 to allow roof 1 to move into and out of storage compartment 11.

A kinematic system is operable for moving roof 1 between the closed and stored roof positions. The kinematic system includes kinematic units by which roof parts 2, 3, 4 may be pivotably coupled to the vehicle body or to one another in an adjustable manner. In an embodiment, the kinematic system forms a kinematic chain in which rear roof part 4 is pivotably held on the vehicle body, center roof part 3 is adjustably held on rear roof part 4, and front roof part 2 is adjustably held on center roof part 3.

Figure 2:
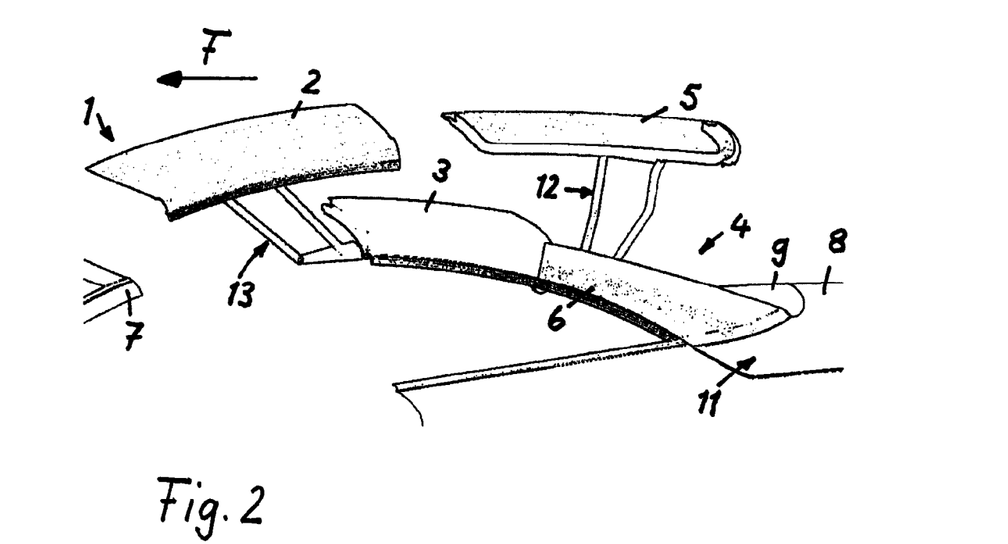
FIG. 2 illustrates a side view of the movement of the roof into an initial position from the closed position toward a stored position in which in the initial position the rear window is raised from a normal position between C-pillars of the rear roof part and moved forward above the center roof part and at the same time the front roof part is moved to the rear above the center roof part.

As shown in FIG. 2, an adjusting device 12 adjustably holds rear window 5 onto rear roof part 4. Adjusting device 12 is mounted on components of rear roof part 4. In an embodiment, adjusting device 12 is a four-bar kinematic linkage. Upon actuation of adjusting device 12, rear window 5 swivels from its normal position between C-pillars 6 in the plane of rear roof part 4 into its elevated raised position in which rear window 5 is lifted up from rear roof part 4 and C-pillars 6. This uncovers the space between C-pillars 6 thus allowing trunk lid 8 together with storage shelf 9 to be lifted in a collision-free manner about a transverse swivel axis at the rear of the vehicle. The raising motion of rear window 5 with respect to C-pillars 6 allows trunk lid 8 and storage shelf 9 to open for storage compartment 11 to be uncovered.

Figure 3:
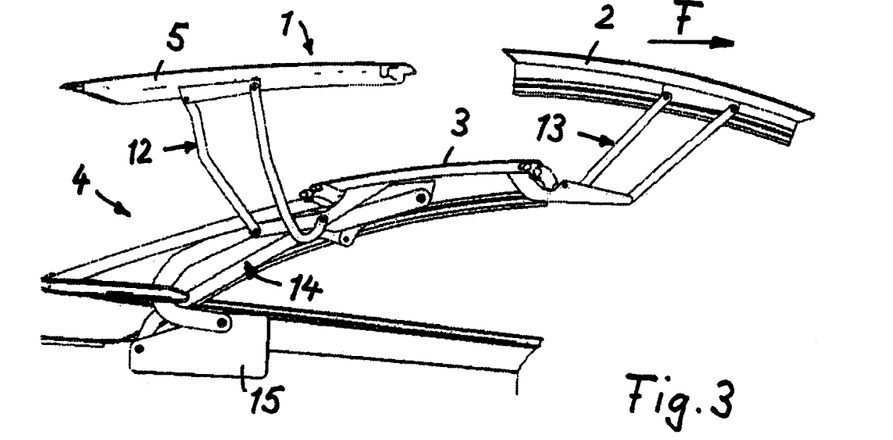
FIG. 3 illustrates a different side view of the initial position shown in FIG. 2 with the C-pillars of the rear roof part omitted from the illustration.
Figure 4:
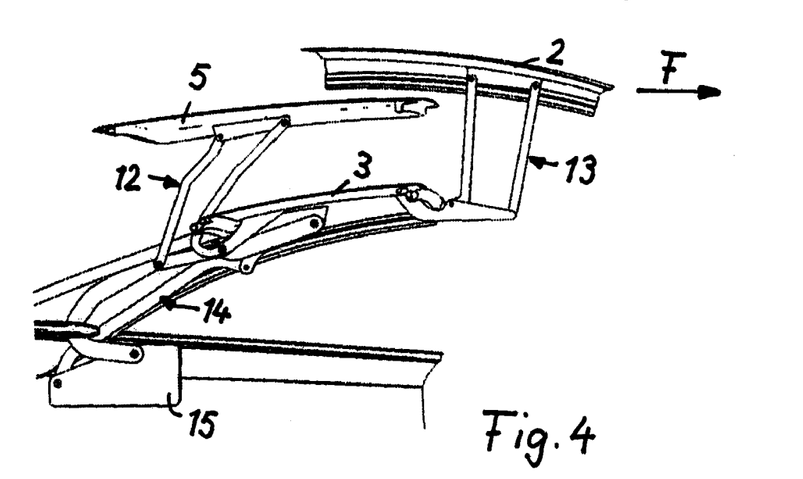
FIG. 4 illustrates a side view of the movement of the roof into a first advanced position from the initial position toward the stored position in which in the first advanced position the rear window lies above the center roof part and the front roof part lies partially above the rear window.
Figure 5:
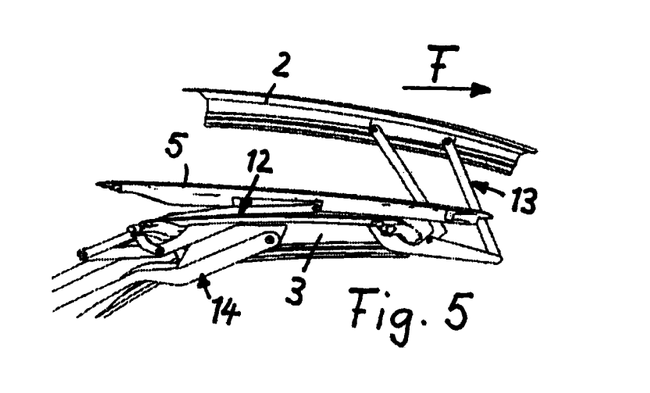
FIG. 5 illustrates a side view of the movement of the roof into a second advanced position from the first advanced position toward the storage position in which in the second advanced position the rear window rests on the center roof part and the front roof part lies above the rear window and the center roof part.
Figure 6:
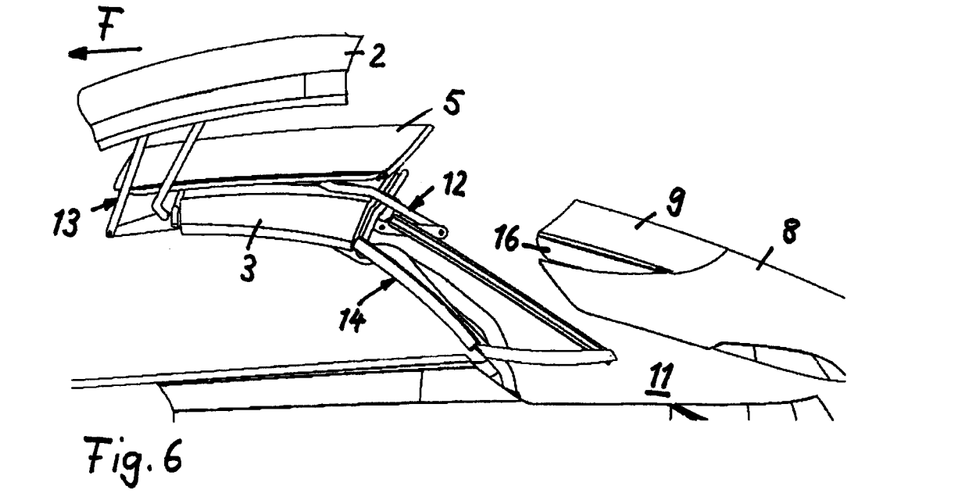
FIG. 6 illustrates another side view of the roof in the second advanced position shown in FIG. 5 in which the trunk lid is in a partially raised position for uncovering a storage compartment of the vehicle in which the roof is to be stored when the roof is in the storage position.

Referring now to FIGS. 2 through 10, with continual reference to FIG. 1, the movement of roof 1 from its closed position to its stored position will be described in further detail. In its stored position, roof 1 is folded into a stacked roof package in which roof parts 2, 3, 4 and rear window 5 are folded on top of one another and lowered into storage compartment 11. The stacked roof package with front roof part 2 on top, rear window 5 in the middle, and center roof part 3 on the bottom is shown in FIGS. 2 through 4 in progressive intermediate stages and is shown in FIGS. 5 through 10 in final stages.

FIG. 2 illustrates movement of roof 1 into an initial position from the closed position toward the stored position. In this initial position, rear window 5 is raised from its normal position between C-pillars 6 of rear roof part 4 and moved forward above center roof part 3 and at the same time front roof part 2 is moved rearward above center roof part 3. Adjusting device 12 actuates to move rear window 5 into its raised position above C-pillars 6. The raising motion of rear window 5 is simultaneously combined with a translational forward adjusting motion to partially position rear window 5 above center roof part 3. The raising motion of rear window 5 from rear roof part 4 uncovers the region between C-pillars 6. This allows trunk lid 8 together with storage shelf 9 to raise about the rear swivel axis thereby uncovering storage compartment 11.

Adjusting device 12 moves rear window 5 forward into a position above and parallel to center roof part 3 in order to obtain the stacked roof part package in which front roof part 2, rear window 5, and center roof part 3 are oriented in the same direction. Via actuation of a kinematic unit 13, front roof part 2 moves rearward into a position above and parallel to rear window 5. Kinematic unit 13 adjustably holds front roof part 2 on center roof part 3. In an embodiment, kinematic unit 13 is a four-bar kinematic linkage.

As shown in FIGS. 3 through 8, a kinematic device 14 adjustably connects rear roof part 4 to the vehicle body. Kinematic device 14 is a component of the kinematic system used for moving roof 1 between its closed and stored positions. Guide rods of kinematic device 14 are pivotably held on a bracket 15. Bracket 15 is fixed to the vehicle body. Kinematic device 14 may also perform a relative control motion with respect to the vehicle body. When kinematic device 14 is actuated, C-pillars 6 and optionally the components associated with C-pillars 6 other than rear window 5 swivel in to the rear about a transverse axis into storage compartment 11. As a result, C-pillars 6 are stored in storage compartment 11 with their outer side facing downward. C-pillars 6 thus assume an opposite orientation with respect to front roof part 2, rear window 5, and center roof part 3 of the stacked roof package.

Figure 7:
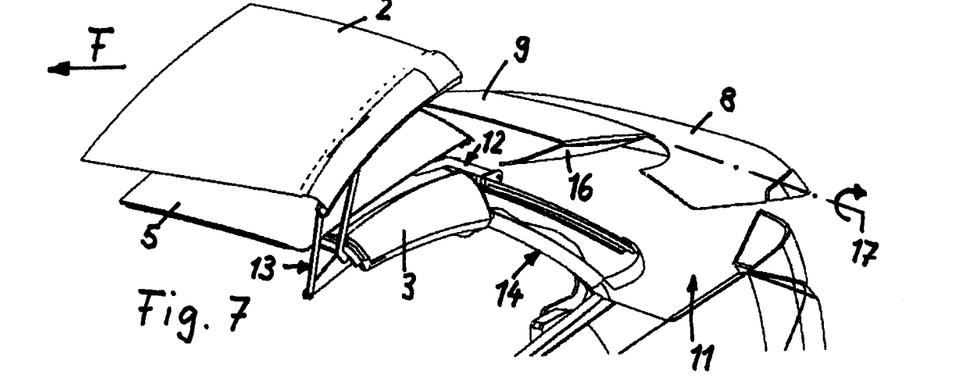
FIG. 7 illustrates a front diagonal view of the roof in the second advanced position shown in FIGS. 5 and 6.
Figure 8:
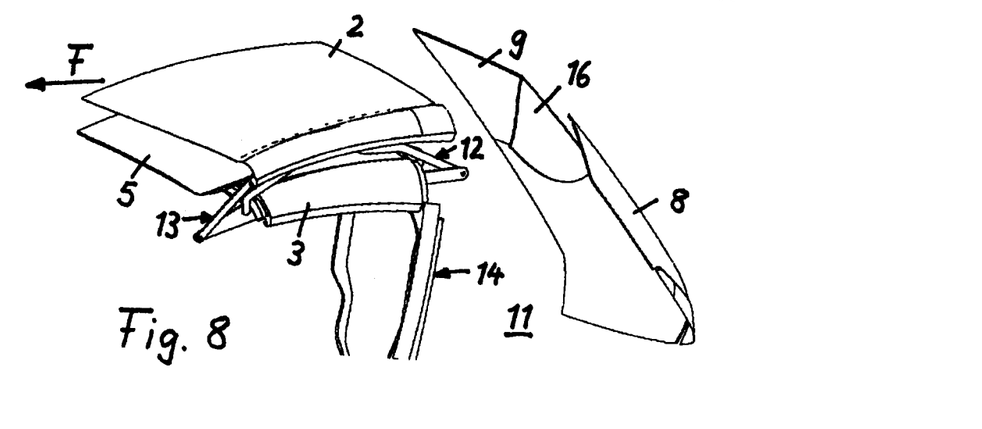
FIG. 8 illustrates a side view of the movement of the roof into a third advanced position from the second advanced position toward the storage position in which in the third advanced position the rear window rests on the center roof part and the front roof part rests on the rear window with the trunk lid raised to uncover the storage compartment.
Figure 9:
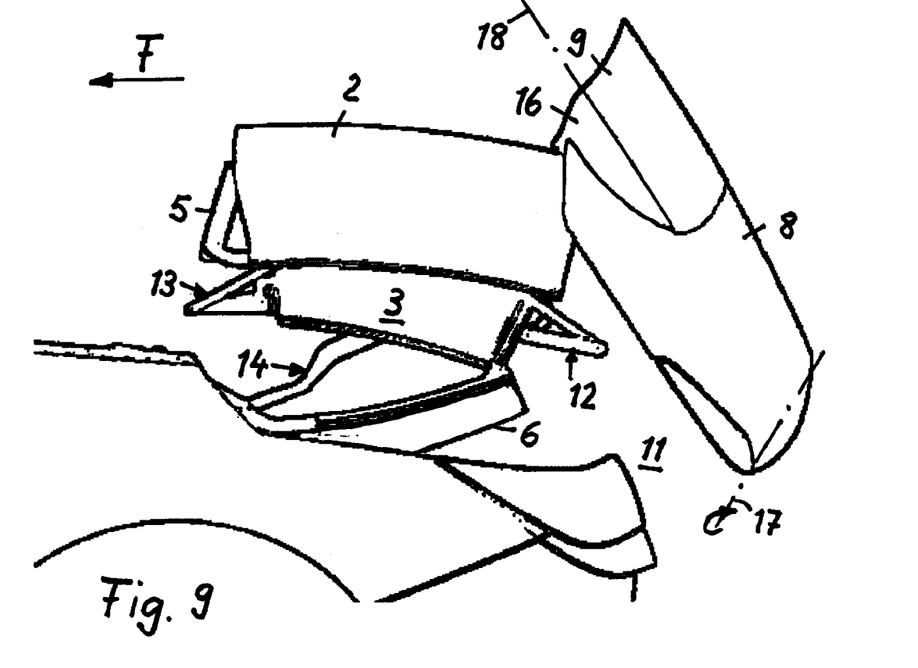
FIG. 9 illustrates a side view of the movement of the roof into a fourth advanced position from the third advanced position toward the storage position in which in the fourth advanced position the stacked front, center, and rear roof parts and the rear window have been partially lowered into the storage compartment.
Figure 10:
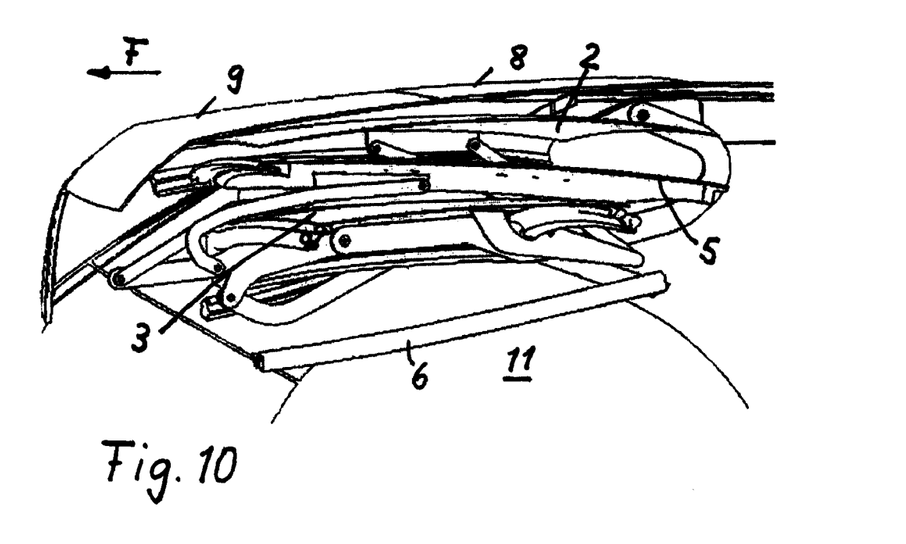
FIG. 10 illustrates a side view of the roof in the storage position in which the stacked front, center, and rear roof parts and the rear window are stored within the storage compartment with the trunk lid closed over the storage compartment.

FIGS. 7 and 9 illustrate rotational axis 17 of trunk lid 8. Rotational axis 17 runs transversely at the rear of the vehicle. Trunk lid 9 together with storage shelf 9 swivel about rotational axis 17 upward to uncover storage compartment 11. Rotational axis 17 is a component of a rear rotary joint. The rear rotary joint releases for the rear edge of trunk lid 8 to open in order to open the trunk.

As shown in FIGS. 6 through 10, a pair of side flaps 16 located on respective side regions of storage shelf 9 are pivotably held on storage shelf 9. Side flaps 16 are movable about a rotational axis 18 between a downward folded-in position and a folded-out position. Rotational axis 18 runs in the longitudinal direction of the vehicle with respect to storage shelf 9. In the downward folded-in position, side flaps 16 are situated below storage shelf 9. In the folded-out position, side flaps 16 lie in a common plane with storage shelf 9. When roof 1 is in its closed position, side flaps 16 are folded in. When roof 1 is in its opened position, side flaps 16 are folded out to cover the regions in the vehicle body from which the kinematic system of roof 1 emerges when roof 1 is in its closed position.

Figure 11:
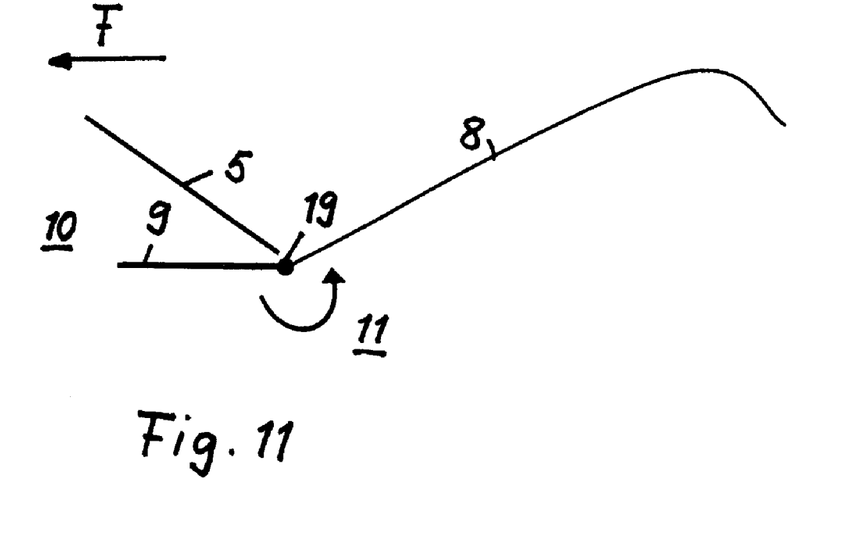
FIG. 11 illustrates a schematic of the trunk lid and the storage shelf pivotably held thereon with the trunk lid open for loading the trunk.
Figure 12:
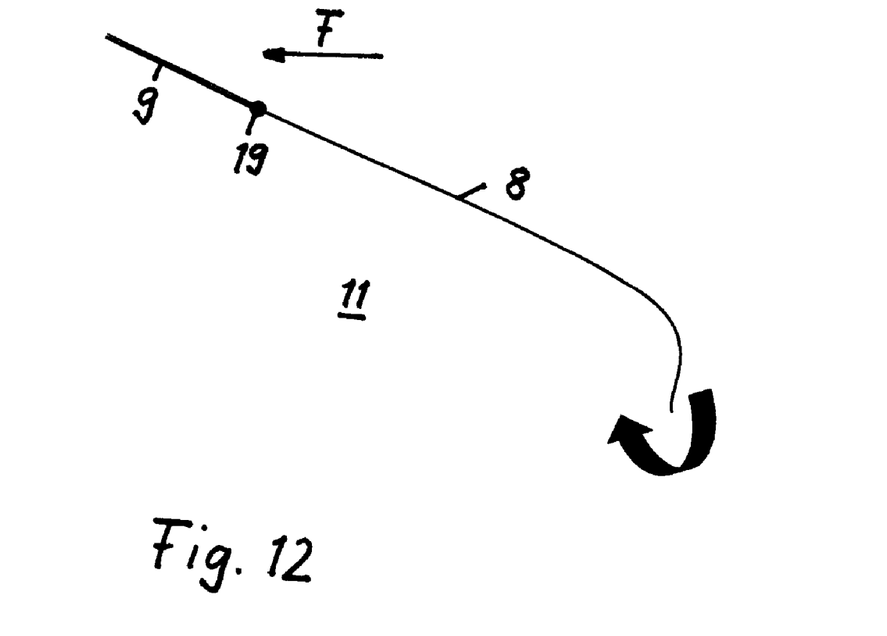
FIG. 12 illustrates a schematic of the trunk lid and the storage shelf pivotably held thereon with the trunk lid and the storage shelf raised about a swivel axis situated at the rear of the vehicle for the opening the storage compartment.

FIGS. 11 and 12 illustrate trunk lid 8 and storage shelf 9 in different situations. In FIG. 11, roof 1 is in its closed position in which rear window 5 may be seen. Storage shelf 9 horizontally extends below rear window 5 into vehicle interior 10. To open the trunk, the rear lock of trunk lid 8 is unlocked and trunk lid 8 is swivelled upward about rotary joint 19. Rotary joint 19 pivotably connects storage shelf 9 to trunk lid 8. In the closed position of roof 1, it is practical to support rotary joint 19 on the vehicle body side. FIGS. 7 and 9 illustrate rotational axis 18 of rotary joint 19.

As shown in FIG. 12, to store roof 1 in storage compartment 11 or to lift it therefrom, trunk lid 8 swivels upward about the rear rotary joint (i.e., about rotational axis 17 shown in FIGS. 7 and 9). During this upward swivel motion storage shelf 9 remains in a common plane with trunk lid 8.

LIST OF REFERENCE NUMERALS

1 Vehicle roof
2 Front roof part
3 Center roof part
4 Rear roof part
5 Rear window
6 C-pillars
7 Windshield frame
8 Trunk lid
9 Storage shelf
10 Vehicle interior
11 Storage compartment
12 Adjusting device
13 Kinematic unit
14 Kinematic device
15 Bracket
16 Side flaps
17 Rotational axis
18 Rotational axis
19 Rotary joint While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A convertible vehicle comprising:
a storage compartment;
a trunk lid movable to open and close the storage compartment;
a roof having a plurality of roof parts including a rear roof part, wherein the roof is movable between a closed position in which the roof parts cover the vehicle interior and a stored position in which the roof parts are stacked on top of one another and stored in the storage compartment thereby exposing the vehicle interior;
wherein the rear roof part includes a pair of C-pillars on respective sides of the vehicle body and a rear window, wherein the rear window is independently movable from the rear roof part between a normal position in which the rear window lies between the C-pillars in a plane of the rear roof part and a raised position in which the rear window lies outside of the plane of the rear roof part;
an adjusting device connected between the rear roof part and the rear window for moving the rear window between the normal and raised positions; and
a storage shelf connected to the trunk lid on a side of the trunk lid facing the vehicle interior, wherein the storage shelf extends below the rear roof part into the vehicle interior when the roof is in the closed position.

2. The vehicle of claim 1 wherein:
the storage shelf is movably held directly on the trunk lid.

3. The vehicle of claim 2 wherein:
the storage shelf is pivotably held on the trunk lid.

4. The vehicle of claim 1 wherein:
the trunk lid swivels about a rotary joint located between the trunk lid and the storage shelf for moving to open and close the storage compartment.

5. The vehicle of claim 1 wherein:
the actuating device moves the rear window to the raised position while the roof is moving from the closed position to the stored position.

6. The vehicle of claim 5 wherein:
the rear window is in the raised position when the roof is in the stored position.

7. The vehicle of claim 1 wherein:
the roof parts further include a center roof part situated in front of the rear roof part when the roof is in the closed position;
wherein the rear window lies above and parallel to the center roof part when the rear window is in the raised position.

8. The vehicle of claim 1 wherein:
the storage shelf is held on a support frame of the trunk lid.

9. The vehicle of claim 1 wherein:
the roof parts further include a front roof part and a center roof part, wherein the center roof part is situated in front of the rear roof part and the front roof part is situated in front of the center roof part when the roof is in the closed position;
wherein the rear window is movable over the center roof part and the front roof part and the front roof part is movable over the rear window such that the window is situated between the front and the center roof parts.

10. The vehicle of claim 9 wherein:
in the stored position of the roof, the roof parts form a stacked roof package in which the front roof part is on top of the stacked roof package and the rear window lies beneath the front roof part and over the center roof part.

11. The vehicle of claim 9 wherein:
during movement of the roof from the closed position to the stored position, in a first phase of motion the rear window is moved to the raised position, and in a subsequent phase of motion the roof parts including the raised rear window are moved into the storage compartment.

12. The vehicle of claim 1 further comprising:
a kinematic system connected between the vehicle body and at least one of the roof parts for moving the roof between the closed and stored positions.

13. A roof for a convertible vehicle having a storage compartment and a trunk lid movable to open and close the storage compartment, the roof comprising:
front, center, and rear roof parts, wherein the rear roof part includes a pair of laterally spaced apart pillars;
a rear window;
an adjusting device movably supporting the rear window onto the rear roof part such that the rear window is movable between a normal position in which the rear window lies between the pillars of the rear roof part in a plane of the rear roof part and a raised position in which the rear window lies outside of the plane of the rear roof part;
wherein the roof parts are independently movable from the rear window between a closed position for covering the interior of the vehicle and a stored position for storage in the storage compartment;
wherein in the closed position, the rear window is in its normal position lying between the pillars of the rear roof part in the plane of the rear roof part, the front roof part lies in front of the center roof part, the center roof part lies in front of the rear roof part, and the pillars of the rear roof part extend upward and forward;
wherein in the stored position, the rear window is in its raised position lying outside of the plane of the rear roof part and above the center roof part, the front roof part lies above the rear window, and the pillars of the rear roof part extend downward and rearward such that the rear window and the front, center, and rear roof parts are arranged in a stack; and
a storage shelf connectable to the trunk lid such that the storage shelf extends below the rear roof part in the closed position.

14. The roof of claim 13 wherein:
the storage shelf is movably connectable to the trunk lid.

15. The roof of claim 13 wherein:
the storage shelf is pivotably connectable to the trunk lid.

16. The roof of claim 13 wherein:
the actuating device moves the rear window to the raised position while the roof parts are moving from the closed position to the stored position.

17. The roof of claim 16 wherein:
the rear window is in the raised position when the roof parts are in the stored position.

18. The roof of claim 13 wherein:
the storage shelf is connectable to a support frame of the trunk lid for being connected to the trunk lid.

19. The roof of claim 13 wherein:
during movement of the roof parts from the closed position to the stored position, in a first phase of motion the rear window is moved to the raised position, and in a subsequent phase of motion the roof parts including the raised rear window are moved for storage in the storage compartment.

20. The roof of claim 13 further comprising:
a kinematic system connectable between the vehicle and at least one of the roof parts for moving the roof parts between the closed and stored positions.

* * * * *